Patented Jan. 2, 1945

2,366,517

UNITED STATES PATENT OFFICE 2,366,517

LUBRICATING COMPOSITION

Anthony H. Gleason, Westfield, N. J., assignor to Standard Oil Development Company, a corporation of Delaware No Drawing. Application March 27, 1943, Serial No. 480,831

8 Claims. (Cl. 252—56)

This invention relates to lubricating oils blended with compounds to impart to the composites good viscosity characteristics. The invention relates particularly to the blending in mineral lubricating oils of new type copolymer products as a means of preparing lubricating oil compositions of good viscosity-temperature characteristics.

The lubricating oil industry has been confronted for some time with meeting the demands of improved designs for internal combustion engines used extensively in automobiles and aircraft. The operating conditions in these new type engines are the prevalence of high temperatures and pressures. Hydrocarbon oils alone are thus unsuitable in these newly designed engines, but by the blending in these oils certain compounds this deficiency is overcome. Moreover, by such blending there are prepared many highly satisfactory lubricants in a simple and relatively inexpensive manner. To this field of development the present invention relates.

Hydrocarbon polymeric materials have been employed for some time as advantageous lubricating oil addition agents. The particular advantages of these compounds are that they are relatively selective in improving the viscosity-temperature relationship without adversely affecting other desirable properties of the mineral oils. Moreover, many of these polymeric materials may be prepared from refinery by-products and greater utilization may be thus effected of these materials.

The lubricating oil addition agent of this invention is basically a copolymer product of a styrene compound and an unsaturated ester. The products so obtained are relatively stable materials particularly effective in lubricating oils as viscosity index improving agents. These copolymer compounds possess characteristics not normally obtained by the polymerization of either of the reactants separately. Thus, polystyrene even of relatively low molecular weight is almost completely insoluble in paraffin base oils even though the structure of this polymer is essentially linear in character. The unsaturated esters, on the other hand, are generally characterized by oil-solubility, but a very slow rate of polymerization or none at all. In the case of the unsaturated ester, therefore, considerable difficulty may be experienced in obtaining a polymer having any value as a viscosity index improver. In the copolymer product of this invention the advantageous effects, without the disadvantageous characteristics to any substantial extent, of both reactants are made available by the choice of suitable reacting proportions. Thus in the preparation of lubricating oil additives of this invention, the marked polymerization promoting activity of styrene is satisfactorily coupled with the oil solubilizing characteristics of the ester.

The styrene compounds which may be used in addition to styrene itself are those having nuclear substituents. It has been found that, in general, styrenes substituted in the alpha or beta positions of the molecule lack the desired degree of polymerizing activity. The nuclear substituents are preferably either alkyl or aryl-alkyl groupings but heterocyclic, alkoxy and halogen-containing groups which do not affect adversely substantially the solubility of the resultant copolymer may be advantageously present. In general, however, the more polar the substituent group the greater is usually the adverse effect upon oil solubility. The substituents may be present in any position upon the nucleus in the styrene molecule. The presence of alkyl groups normally improves the oil solubility but may have a slight adverse effect upon the polymerizing action in the formation of the copolymer compounds. Thus, the presence of alkyl substituents is normally desirable, providing the polymerizing activity of the vinyl group is not substantially diminished. The solubility of the copolymer is effected also by the number of carbon atoms in the alcoholic portion of the ester. Thus a very satisfactory product is prepared from styrene and the ester of an unsaturated acid and an alcohol having at least five carbon atoms. In the absence of alkyl groups in the styrene reactant, it has been found necessary to employ an ester containing an alcohol of higher molecular weight, for example one of about 12 carbon atoms.

The unsaturated esters employed as reactants in the preparation of the copolymer product are preferably unsaturated in the acidic portion of the molecule; that is, they are formed from unsaturated acids. The alcohol portion of the molecule may be unsaturated, provided the activity of the double bond is not such as to be reactive in contact with the styrene compound. Acids from which suitable esters are formed are acrylic, crotonic, methacrylic, maleic, fumaric and cinnamic acids. In order to ensure complete oil solubility, it is advisable to employ esters prepared from the higher alcohols such as octyl, dodecyl, or octadecyl.

The copolymerization between the styrene compound and the unsaturated ester is effected at a temperature usually between 130° C. and 140° C. The mixture is heated for several days in a sealed tube and preferably in the presence of an organic peroxide such as benzoyl peroxide as a catalyst. The products obtained are dissolved in naphtha or benzol and precipitated therefrom by the addition of a lower alcohol such as ethanol. The reaction products usually vary in physical characteristics from being highly viscous liquids to having a consistency of almost a solid. Analyses of the products indicate that the ratio of styrene to ester in the copolymer on a molar basis is considerably greater than one.

The copolymers of the invention may also be produced by carrying out the polymerization under emulsification conditions and at a lower temperature. Thus two parts of styrene and one part of octyl fumarate emulsified with six parts of a 2% lauryl amine hydrochloride solution were heated at 55–60° C. for 17 hours in the presence of 0.1% potassium persulfate and 0.2% carbon disulfide. On coagulation a soft, oil-soluble, resin was obtained in 55% yield which contained 33% by weight of the fumaric ester.

The copolymer product is blended in mineral lubricating oils in amounts between 0.25% and 7% by weight of the oil. In most cases, however, the copolymer products are blended in the oils in amounts between 0.5% and 5% by weight of the oil. In these percentage ranges the copolymer product has a substantial blending effect with mineral oils for imparting to the composite an enhanced viscosity index without adversely affecting other desirable properties of the mineral oil, especially stability under oxidizing conditions and resistance to deterioration such as sludge formation and development of corrosive tendencies.

As specific illustrations of the invention, the following examples are presented:

Example 1

A mass copolymer was prepared by heating a mixture of two volumes of a p-methyl styrene (57% purity, the impurities consisting of saturated aralkyl compounds which were nonreactive) and one volume of octyl fumarate with 1% benzoyl peroxide for 72 hours at 110° C. The purified copolymer when blended in lubricating oil presented the following comparison data:

|  | Vis./100 | Vis./210 | V. I. |
|---|---|---|---|
| Mineral oil S. A. E. 20W+2% copolymer | 382.1 | 52.7 | 63 |
| Mineral oil S. A. E. 20W alone | 275.8 | 45.9 | 13 |

Example 2

Two parts p-methyl styrene (57% purity as above) and one part of octyl cinnamate were emulsified with six parts lauryl amine hydrochloride solution (2% pH 5.7) containing 0.1% potassium persulfate and heated for two days at 50° C. On coagulation of the resulting latex a copolymer was obtained which possessed the same potency in raising the Viscosity Index as the product described in the previous example.

Example 3

About equal volumes of dodecyl maleate and styrene were mixed with 2% by weight of benzoyl peroxide and the mixture heated in a sealed tube for 48 hours at a temperature between 130° C. and 140° C. The crude product was a clear, highly viscous oil. Purification was obtained by dissolving the product in benzol and reprecipitating from solution by the addition of methanol. The dry product was substantially a solid. Analysis of the product indicated 25% by weight formed from the dodecyl maleate; that is, a styrene-ester mol ratio of 15 to 1. When dissolved in an S. A. E. 20 oil the following comparison of data was obtained:

|  | Vis./100 | Vis./210 | V. I. |
|---|---|---|---|
| Mineral oil S. A. E. 20W | 275.8 | 45.9 | 13 |
| Mineral oil S. A. E. 20W+3% copolymer | 367.3 | 52.8 | 70 |

Example 4

Dodecyl cinnamate was mixed with ⅔ of its volume of styrene in the presence of about 2% of benzoyl peroxide and heated in a sealed tube between 130° C. and 140° C. for about 2 days. The crude product was a clear, highly viscous liquid soluble in petroleum hydrocarbons and benzol and insoluble in the lower alcohols. The product was purified by dissolving in benzol and reprecipitating by the addition of isopropanol. Analysis of the purified product indicated a mol ratio of styrene to dodecyl cinnamate of 5 to 1. When 3% was dissolved in S. A. E. 20 oil the following comparison of data was obtained:

|  | Vis./100 | Vis./210 | V. I. |
|---|---|---|---|
| Mineral oil S. A. E. 20W | 275.8 | 45.9 | 13 |
| Mineral oil S. A. E. 20W+3% copolymer | 405.0 | 55.8 | 81 |

Example 5

Equal volumes of dodecyl methacrylate and styrene containing a trace of benzoyl peroxide were heated at 105° C. overnight. The product obtained was dissolved in benzene and reprecipitated by the addition of isopropanol. Analysis of the product indicated 54% by weight of dodecyl methacrylate; that is, a mol ratio of styrene to ester of 3 to 1. When dissolved in an S. A. E. 20 mineral lubricating oil the following comparative data were obtained:

|  | Vis./100 | Vis./210 | V. I. |
|---|---|---|---|
| Mineral oil S. A. E. 20W | 275.8 | 45.9 | 13 |
| Mineral oil S. A. E. 20W+2% copolymer | 441 | 57.3 | 80 |

The invention now having been described and illustrated, what is claimed is:

1. A lubricating composition comprising a mineral lubricating oil and 0.25% to 7% of an oil-soluble copolymer of a styrene and an unsaturated ester.

2. A lubricating composition according to claim 1 in which the oil-soluble copolymer is formed from a nuclear substituted styrene.

3. A lubricating composition according to claim 1 in which the unsaturated ester is formed from an unsaturated acid.

4. A lubricating composition according to claim 1 in which the unsaturated ester is formed from an unsaturated acid and an alcohol having at least five carbon atoms.

5. A lubricating composition comprising a mineral lubricating oil and between 0.5% and 5% by weight of a copolymer of a styrene and an ester formed from an unsaturated acid.

6. A lubricating composition according to claim 5 in which the copolymer is formed from styrene and an ester of methacrylic acid.

7. A lubricating composition according to claim 5 in which the copolymer is formed from styrene and an ester of fumaric acid.

8. A lubricating composition according to claim 5 in which the copolymer is formed from styrene and an ester of cinnamic acid.

ANTHONY H. GLEASON.